(12) United States Patent
Canali et al.

(10) Patent No.: US 7,941,556 B2
(45) Date of Patent: May 10, 2011

(54) MONITORING FOR REPLICA PLACEMENT AND REQUEST DISTRIBUTION (75) Inventors: Claudia Canali, Modena (IT); Alexandre Gerber, Madison, NJ (US); Stephen Fisher, Mountain View, CA (US); Michael Rabinovich, Solon, OH (US); Oliver Spatscheck, Randolph, NJ (US); Zhen Xiao, Randolph, NJ (US)

(73) Assignee: AT&T Intellectual Property I, LP, Reno, NV (US)

( * ) Notice: Subject to any disclaimer, the term of this patent is extended or adjusted under 35 U.S.C. 154(b) by 1097 days.

(21) Appl. No.: 11/290,137

(22) Filed: Nov. 30, 2005
(Under 37 CFR 1.47)

(65) Prior Publication Data
US 2006/0190602 A1 Aug. 24, 2006

Related U.S. Application Data (60) Provisional application No. 60/655,339, filed on Feb. 23, 2005.

(51) Int. Cl.
G06F 15/173 (2006.01)
(52) U.S. Cl. ........................................ 709/238; 370/351
(58) Field of Classification Search .................. 709/238, 709/223, 224; 705/35
See application file for complete search history.

(56) References Cited

U.S. PATENT DOCUMENTS

| 6,021,426 A | 2/2000 | Douglis et al. | |
| 6,484,143 B1* | 11/2002 | Swildens et al. | 705/1 |
| 7,496,661 B1* | 2/2009 | Morford et al. | 709/224 |
| 7,844,513 B2* | 11/2010 | Smith | 705/35 |
| 2002/0129134 A1 | 9/2002 | Leighton et al. | |
| 2002/0143798 A1* | 10/2002 | Lisiecki et al. | 707/200 |
| 2002/0143888 A1* | 10/2002 | Lisiecki et al. | 709/214 |
| 2003/0172145 A1* | 9/2003 | Nguyen | 709/223 |
| 2004/0264385 A1* | 12/2004 | Hennessey et al. | 370/252 |
| 2004/0267875 A1* | 12/2004 | Hennessey et al. | 709/200 |

FOREIGN PATENT DOCUMENTS

| EP | 0892531 A | 1/1999 |
| EP | 1207688 A | 5/2002 |
| WO | WO 01/14990 A | 3/2001 |
| WO | WO 03/009157 A | 1/2003 |

OTHER PUBLICATIONS

"pktstat" Real-time interface traffic viewer. First release indicated as May 10, 2004.*

(Continued)

*Primary Examiner* — Dustin Nguyen
(74) *Attorney, Agent, or Firm* — Larson Newman & Abel, LLP (57) ABSTRACT A platform that may be used to dynamically reallocate resources to support an Internet application is disclosed. In an embodiment, the platform may include two layers of distribution, one at the domain name server (DNS) layer and one at an Internet data center layer. The platform may include a dynamic resource allocation manager that causes instances of applications to be initiated in Internet data centers in response to dynamic conditions and characteristics of the application. A monitoring system module may be provided to keep the dynamic resource allocation manager informed as the health and utilization of instances of the application.

20 Claims, 8 Drawing Sheets

OTHER PUBLICATIONS

M. Caesar, D. Caldwell, N. Feamster, J. Rexford, A. Shaikh and J. van der Merwe, "Design and implementation of a routing control platform," NSDI—May 2005, available at http://www.cs.princeton.edu/~jrex/papers/rcp-nsdi.pdf (last visited Mar. 9, 2006).

N. Feamster, H. Balakrishnan, J. Rexford, A. Shaikh and J. van der Merwe, "The case for separating routing from routers, " in *Proc. ACM SIGNCOMM Workshop on Future Directions in Network Architecture,* Aug. 2004.

O. Bonaventure, S. Uhlig, and B. Quoitin, "The case for more versatile BGP Route reflectors." Internet Draft draft-bonaventure-bgp-route-reflectors-00.txt, Jul. 2004, available at http://www.potaroo.net/ietf/all-ids/draft-bonaventure-bgp-route-reflectors-00.txt (last visited Mar. 9, 2006).

D.-F. Chang, R. Govindan and J. Heidemann, "An empirical study of router response to large BGP routing table load," in *Proc. Internet Measurement Workshop,* Nov. 2002.

T. Bates, R. Chandra and E. Chen, "BGP Route Reflection—An Alternative to Full Mesh IBGP." RFC 2796, Apr. 2000.

R. Dube, "A comparison of scaling techniques for BGP, "*ACM Computer Communications Review,* vol. 29, Jul. 1999.

T.G. Griffin and G. Wilfong, "On the correctness of IBGP configuration, "In *Proc. ACM SIGCOMM,* Aug. 2002.

A. Basu, C.-H.L. Ong, A. Rasala, F.B. Shepherd and G. Wilfong, "Route oscillations in IBGP with route reflection," in *Proc. ACM SIGCOMM,* Aug. 2002.

D. McPherson, V. Gill, D. Walton and A. Retana, "Border Gateway Protocol (BGP) Persistent Route Oscillation Condition." RFC 3345, Aug. 2002.

A. Shaikh and A. Greenberg, "OSPF monitoring: Architecture, design and deployment experience, " in *Proc. Networked Systems Design and Implementation,* Mar. 2004.

M. Handley, O. Hudson and E. Kohler, "XORP: An open platform for network research," in *Proc. SIGCOMM Workshop on Hot Topics in Networking,* Oct. 2002.

E. Kohler, R. Morris, B. Chen, J. Jannotti and M.F. Kaashoek, "The Click modular router," *ACM Trans. Computer Systems,* vol. 18, pp. 263-297, Aug. 2000.

R. Govindan, C. Alaettinogu, K. Varadhan and D. Estrin, "Route servers for inter-domain routing," *Computer Networks and ISDN Systems,* vol. 30, pp. 1157-1174, 1998.

R. Govindan, "Time-space tradeoffs in route-server implementation," *Journal of Internetworking: Research and Experience,* vol. 6, Jun. 1995.

K. Poduri, C. Alaettinoglu, V. Jacobson, "BST-BGP Scalable Transport." NANOG27, Feb. 2003, available at http://www.nanog.org/mtg-0302/ppt/van.pdf (last visited Mar. 9, 2006).

N. Feamster, J. Winick and J. Rexford, "A model of BGP routing for network engineering," in *Proc. ACM SIGMETRICS,* Jun. 2004.

A. Feldmann, A. Greenberg, C. Lund, N. Reingold and J. Rexford, "NetScope: Traffic engineering for IP networks," *IEEE Network Magazine,* pp. 11-19, Mar. 2000.

Y. Rekhter, T. Li and S. Hares, "A Border Gateway Protocol 4 (BGP-4), " Internet Draft draft-ietf-idr-bgp4-26.txt, Oct. 2004, available at http://vesuvio.ipv6.cselt.it/internet-drafts/draft-ietf-idr-bgp4-26.txt (last visited Mar. 9, 2006).

R. Teixeria, A. Shaikh, T. Griffin and J. Rexford, Dynamics of hot-potato routing in IP networks, in *Proc. ACM SIGMETRICS,* Jun. 2004.

N. Feamster and H. Balakrishnan, "Detecting BGP configuration faults with static analysis," in *Proc. Networked Systems Design and Implementation,* May 2005.

J. Rexford, J. Wang, Z. Xiao and Y Zhang, "BGP routing stability of popular destinations," in *Proc. Internet Measurement Workshop,* Nov. 2002.

N. Spring, R. Mahajan, D. Wetherall and T. Anderson, Measuring ISP topologies of RocketFuel,: in *Proc. ACM SIGCOMM,* Aug. 2002.

EPO Search Communication dated Jun. 30, 2006, 17 pages.

Ranjan S. et al., "Wide area redirection of dynamic content by internet data centers" INFOCOM 2004. Twenty-Third Annual Joint Conference of the IEEE Computer and Communications Societies Hong Kong, PR China Mar. 7-11, 2004, Piscataway, NJ, USA, IEEE, vol. 2, Mar. 7, 2004, pp. 816-826 XP010740829, ISBN: 0-7803-8355-9.

Carter, R.L., et al.,: "On the network impact of dynamic server selection" Computer Networks, Elsevier Science Publishers B.V., Amsterdam, NL, vol. 31, No. 23-24, Dec. 14, 1999, pp. 2529-2558, XP0004415564 ISSN: 1389-1286.

Pan, J., et al.: "An overview of DNS-based server selections in content distribution networks" Computer Networks, Elsevier Science Publishers B.V., Amsterdam, NL., vol. 43, No. 6, Dec. 20, 2003, pp. 695-711, XP004470525 ISSN: 1389-1286.

Andrews M., et al.: "Clustering and server selection using passive monitoring" Proceedings IEE Infocom 2002. The Conference on Computer Communications, 21st. Annual Joint Conference of the IEEEE Computer and Communications Societies. New York, NY, Jun. 23-27, 2002, Proceedings IEEE Infocom. The computer on Computer Communica, vol. 1 of 3 Conf. 21, Jun. 23, 2002), pp. 1717-1725 XP010593740, ISBN: 0-7803-7476-2.

A. Barbir, Nortel Networks, B. Cain, Storigen Systems, R. Nair, Consultant O. Spatscheck, A&T: "Known Content Network (CN) Request-Routing Mechanisms: rfc 3568. txt:" IETF Standard, Internet Engineering Task Force, IETF, Ch., Jul. 2003, XP015009350 ISSN: 0000-0003.

Vahdat, A, et al.,: "WebOS: operating system services for wide area applications" High Performance Distributed Computing, 1998. Proceedings. The Seventh International Symposium on Chicago, IL. USA Jul. 28-31, 1998, Los Alamitos, CA, USA, IEEEE Comput. Soc., US, Jul. 28, 1998, pp. 52-63, EX010298335 ISBN: 0-8186-8579-4.

Shenoy G., et al: "Hydranet-FT: Network Support for Dependable Services" Distributed Computing Systems, 2000. Proceedings. 20th International Conference on Taipei, Taiwan Apr. 10-13, 2000, Los Alamitos, CA, USA, IEEE Comput. Soc., US Apr. 10, 2000, pp. 699-706, XP010379084, ISBN: 0-7695-0601-1.

Mao, Zhuoqing Morley, Crano, Charles D., Douglis, Fred, Rabinovich, Michael, Spatscheck, Oliver, and Wang, Jia, "A Precise and Efficient Evaluation of the Proximity between Web Clients and their Local DNS Servers," 14 pages.

* cited by examiner

MONITORING FOR REPLICA PLACEMENT AND REQUEST DISTRIBUTION

This application claim priority to provisional application Ser. No. 60/655,339, filed Feb. 17, 2005, which is incorporated by reference in its entirety herein.

BACKGROUND OF THE INVENTION

1. Field of the Invention

The present invention relates to the field of distributed computer resources over a wide area network such as the Internet.

2. Description of Related Art

Internet Service Providers provide access to a vast array of nodes or sites, with each site connected to at least one other site, and each site potentially having data of interest to another site. Typically sites are connected to multiple sites, thus there may be numerous routes for communicating between any two sites. While this provides a certain degree of redundancy that is helpful because the loss of a single site will generally not prevent two other sites from communicating, it also causes several problems. First, information may be provided over a route of a series of sites that is not the shortest path or the most efficient route between the start and end points. Second, as the various sites can communication with the other sites on the network, it is easy for a number of sites to access a particular site and cause a sudden jump in traffic at that site.

To route the traffic over the Internet, one common method is to use the domain name system ("DNS"). DNS also refers to domain name server, thus a DNS could be a domain name system or a domain name server, depending on the context. When a client wants to access an Internet site, it first needs to resolve the site's DNS name into an Internet Protocol ("IP") address. To do so, the client sends a DNS query to a local DNS server (LDNS) the client is configured to use for this purpose, and the LDNS forwards the query to an authoritative DNS. The authoritative DNS then performs request distribution by selecting the IP address of an appropriate server to return to the LDNS and ultimately to the client. The client then communicates with the appropriate server.

As noted above, the vast spread of the Internet potentially exposes any site to an almost unlimited number of clients. This potential exposure has created a difficult resource provisioning challenge for Internet site (or service) operators. Often, historical usage patterns are used to determine the capacity that should be reserved for a site, however, historical usage patterns often fail to predict sudden spikes in traffic. These sudden surges of demand for the site can cause the site to crash or be otherwise unavailable; therefore, relying on historical usage patterns to determine the resources that should be reserved for a particular Internet site is unreliable.

Therefore, selecting the amount of resources to be allocated for an Internet application is a calculated risk. This is because provisioning for the highest load leaves the resources idle most of the time, while provisioning for the typical load leads to missed opportunities for the site. For example, provisioning an electronic book store for its typical demand would cause the store to miss out on a buying frenzy that might accompany a major best-seller such as an installment of a HARRY POTTER novel. On the other hand, provisioning enough resources for the HARRY POTTER event would make for a wasted investment most of the time.

While the above issues are known and have been addressed with varying degrees of success with respect to static Internet pages, the problem is more significant when attempting to provide resources for Internet applications. Internet applications are distinguishable from static and dynamic Web pages in that the main value of the Internet application is not the information provided by the transaction, such as a transaction confirmation, but rather the side effect of the transaction—such as the purchase of a good or service. Traditional methods used to optimize delivery of content for static and dynamic Web pages are less suitable to addressing the needs of Internet applications. Therefore, something is needed to address some of the problems encountered when providing Internet applications.

BRIEF SUMMARY OF THE INVENTION

In an aspect of the present invention, a platform is provided that can dynamically provide resources for Internet applications based on changing demand. The platform can use a demand and usage monitoring infrastructure to collect data and use the data to drive resource reallocation. In an embodiment, the platform includes a dynamic resource allocation manager connected to a load balancing DNS module and further connected to one or more Internet data centers that may include a monitoring system module and a load balancing switch module. Client requests may be allocated to available Internet data centers by the load balancing DNS module and to the appropriate server by the load balancing switch module and the monitoring system module can provide feedback to the dynamic resource allocation manager so that appropriate resources are allocated in response to usage. In an embodiment, the dynamic resource allocation manager may be managed by a set of rules that can be modified so as to provide the desired resource allocation policies. In an embodiment, the monitoring system module allows the dynamic resource allocation manager to determine the optimal Internet data center based on proximity metrics. In an embodiment, the dynamic resource allocation manger can update the load balancing DNS module so that client requests are directed to the appropriate Internet data center.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

The replication and consistency maintenance of Internet objects has been studied previously in the context of Internet caching and content delivery networks. One solution has been to migrate the computation from the front-end servers to the clients accessing the information, a process known as edge computing. For example, U.S. Pat. No. 6,021,426 to Douglis et al. discloses such a method and is incorporated by reference in its entirety herein. While such a process can be useful in optimizing the transfer of dynamic Internet pages to the clients, it is insufficient to meet the computing needs of Internet applications.

To address and aid problems encountered in providing Internet applications, aspects of the present invention are disclosed. In an embodiment, a platform provides an architecture that facilitates resource sharing based on network telemetry and the changing demands of and for applications. Its architecture features a rule management system that provides a clear separation of policy and mechanisms and allows decisions regarding resource allocation to be made centrally based on global information. In an embodiment, it may be implemented on top of commercial of the shelf server clustering technology for easy adoption and deployment.

In an embodiment, the platform may be used to monitor performance. This can allow for a determination of performance measurements of access to applications from different clients situated in different regions to different data centers. In an embodiment, the platform can be used to predict performance of new clients to new data centers and therefore can be used to predict a preferred data center for initiating a new instance of an application.

Before discussing details of particular embodiments, several challenges that any utility computing platform for Internet applications that uses DNS-based request distribution will face are discussed in more detail below.

Potential Issues in Provisioning for Internet Applications

As noted above, resource provisioning for Internet applications is a challenging problem: provisioning for the average load is inadequate during a sudden surge of demand, while provisioning for the peak load leaves the resources idle most of the time. Resource provisioning is further complicated by three additional issues: the limitations of DNS-based request distribution; the scalability problem; and the limited availability of passive measurements.

Before discussing these issues in greater detail, it should be noted that the discussion that follows refers to sites that are closest together as having faster connections. It is recognized that the shortest distance between two sites may not always be the fastest route to provide data, however, for simplification the shortest distance is assumed to be the fastest herein. Appropriate modifications can be made to account for available bandwidth and switching delays along various routes as desired.

Figure 1:
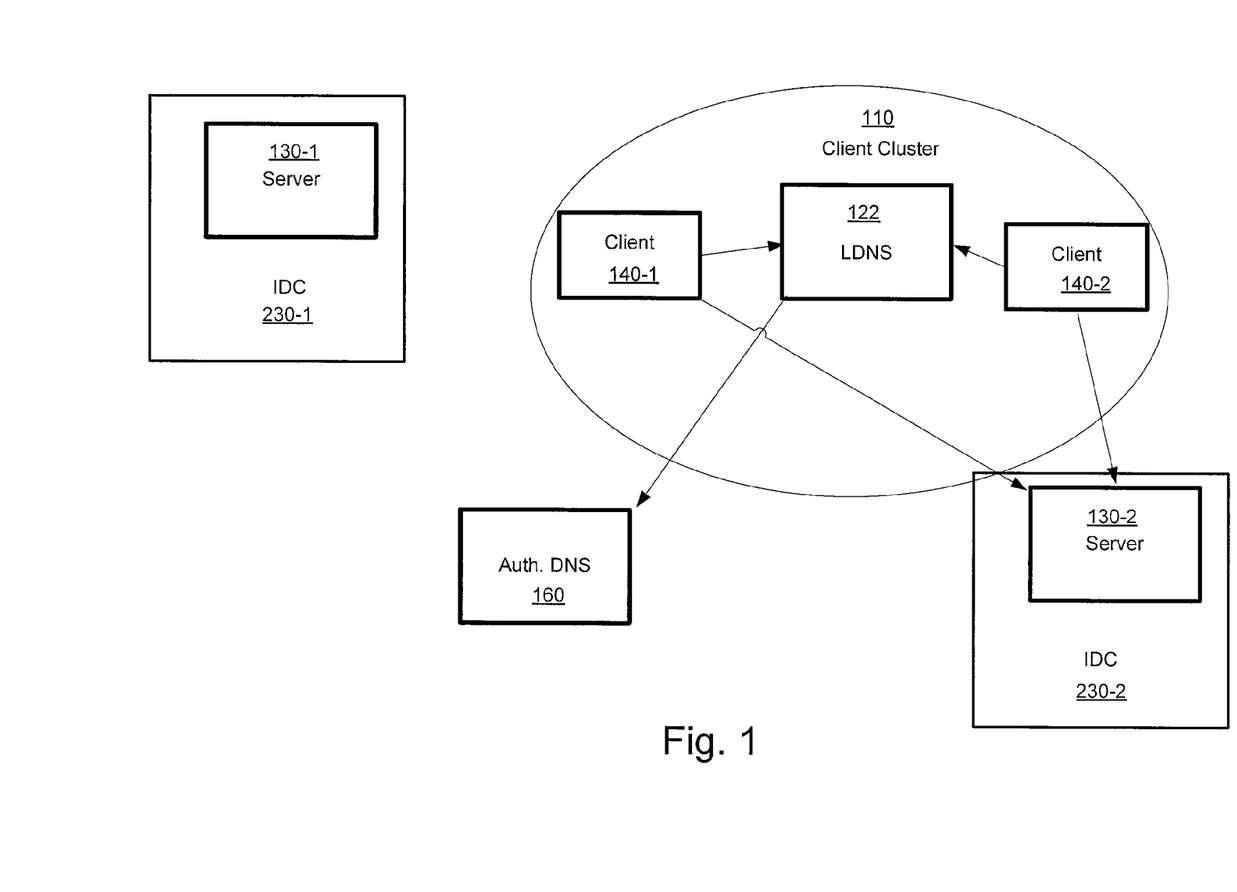
FIG. 1 is a schematic illustration of an embodiment of a network configuration in accordance with an aspect of the present invention.

Turning to FIG. 1, a schematic of a DNS-based request distribution is illustrated. A client cluster 110 that includes client 140-1 and client 140-2 is provided, with both clients 140-1, 140-2 configured to query a LDNS 122 to resolve IP addresses. The LDNS 122 is configured to communicate with an authorizing DNS 160 to obtain the IP address. The authorizing DNS 160, in light of the position of the LDNS 122 with respect to servers 130-1 and 130-2, instructs the LDNS 122 to pass along the IP address of server 130-2. Therefore, clients in the client cluster 110 access server 130-2 located in Internet data center ("IDC") 230-2 rather than server 130-1 located in IDC 230-1. It should be noted that IDC 230-1 and 230-2, as depicted, are part of a system that provides data in response to requests.

As can be appreciated, one drawback of DNS-based request distribution is that the authoritative DNS server does not know the identity of the client that will be accessing the server. Because DNS protocol does not convey the client's identity to the authoritative DNS server, the latter bases its server selection decision on the LDNS's origins and not the client. This might result in suboptimal server selection in conventional CDNs, but it can be much more harmful in a utility computing platform because of a possibility of vicious cycles of resource allocations.

For example, in FIG. 1 the clients 140-1, 140-2 are configured to query the same LDNS 122. As depicted, the two clients 140-1, 140-2 are graphically disperse, as is common in large Internet Service Providers ("ISP") that share a small number of LDNS with a large number of subscribers. However, client 140-1 is closer to server 130-1 in IDC 230-1 while its LDNS 122 is closer to the server 130-2 in IDC 230-2. If both clients are responsible for half the demand of the application, the following scenario may occur.

First, because the authoritative DNS 160 sees all the demand as coming from the vicinity of IDC 230-2, the authoritative DNS will direct requests from both clients 140-1, 140-2 to server 130-2 in IDC 230-2. However, if IDC 230-2 includes a monitoring subsystem, it will observe that half the demand for this application is coming from the vicinity of IDC 230-1 because client 140-1 is closer to server 130-1. Therefore, the system may decide to deploy a replica of the application in IDC 230-1. But even though there are now two application replicas, the authoritative DNS 160 will continue sending all requests to the server 130-2 in IDC 230-2 based on the proximity of the IDC 230-2 to the requesting LDNS 122. As a result, IDC 230-1 will observe no demand for its replica of the application and delete this replica, returning the system to the initial configuration. Thus, the system may attempt to provide additional resources but will be unable to use them correctly.

Figure 3:
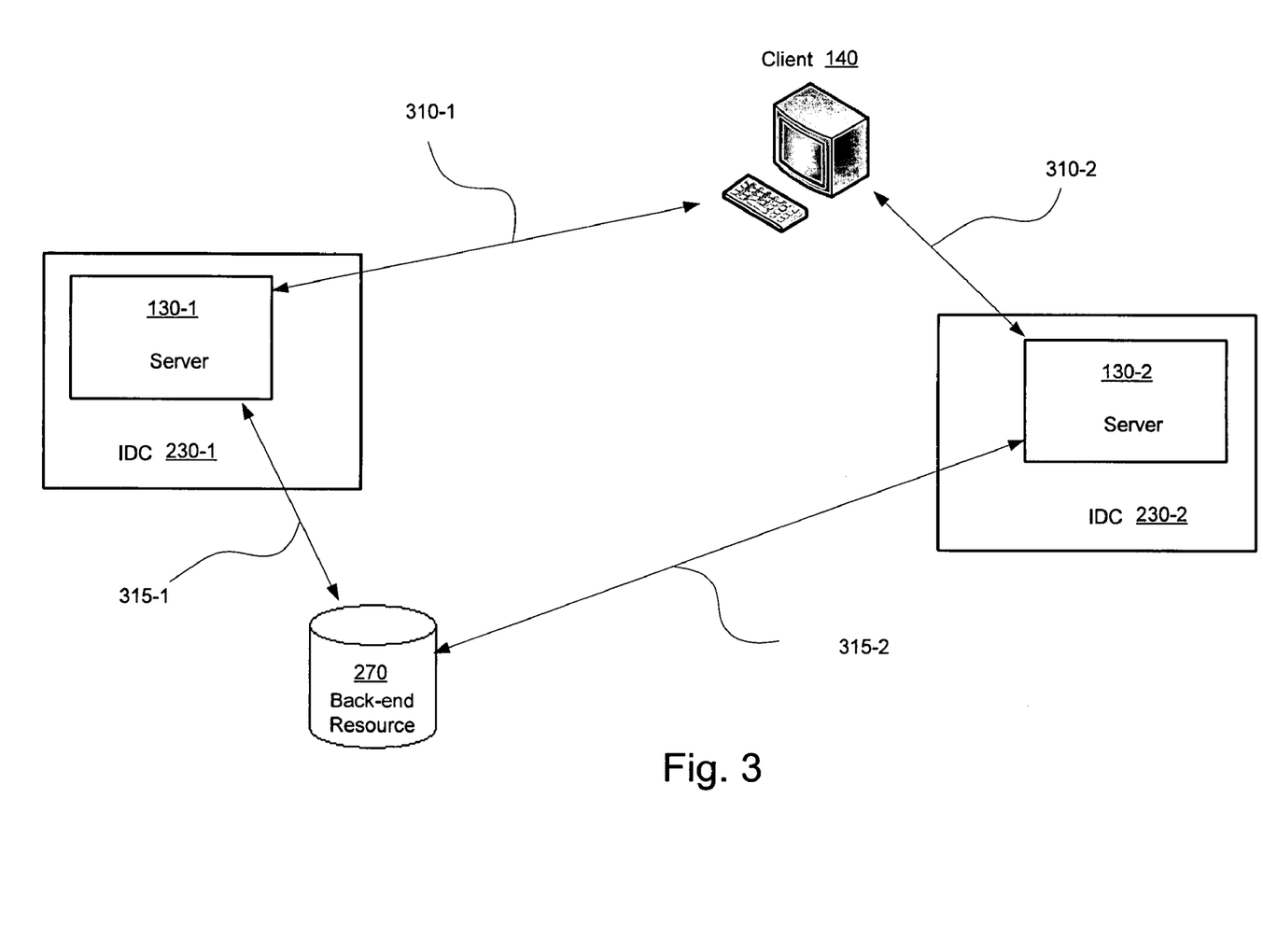
FIG. 3 is a schematic illustration of an embodiment of a network configuration in accordance with an aspect of the present invention.

The scalability problem has to do with prohibitively high volumes of measurement data the monitoring system must collect and process. FIG. 3 illustrates a schematic of a client 140 accessing an application on a server in two IDCs 230-1, 230-2. Preferably, the client 140 will interface with the IDC that is the closest. Given that the client 140 is closer to the server 130-2 in IDC 230-2 while the back-end resource 270 the application needs to access to process the client's 140 request is closer to the server 130-1 located in IDC 230-1, the question which of the two IDCs 230-1, 230-2 is closer to the client 140 depends on the application. If the application performance is dominated by back-end communication between the IDCs 230-1, 230-2 and the back-end resource 270, then the IDC 230-1 will be preferable. However, if the application performance is dominated by front-end communication between the client 140 and the IDCs 230-1, 230-2 then the IDC 230-2 would be preferable. Thus, the proximity of clients to various data centers is not only specific to a given client and data center, but also to a given application. In other words, the proximity measurement must map the triple (client, data center, application) tuple to a proximity metric in order to determine the optimized route.

If a DNS system is used, clients may be grouped into client clusters that share the same LDNS. Observations have identified around 1.5M different LDNSs and the number of LDNSs is likely to rise. If one assumes that a platform would include 20 data centers and would host 100 applications, then the monitoring subsystem would need to maintain around 3 billion proximity metric values. This would equate to about 12 billion bytes of data assuming each data point is a 4-byte number. Given that the most reliable method of assessing proximity is to measure actual performance of a client's access, the above data would need to be periodically collected at the data centers and transferred to the platform core such as the authoritative DNS. Considering that this data needs to be constantly refreshed in order to provide a meaningful estimation of current performance, for example, a 30 second refresh period may be used, transferring such volumes of measurement data is currently infeasible.

If a DNS system is used, clients may be grouped into client clusters that share the same LDNS. Observations have identified around 1.5M different LDNSs and the number of LDNSs is likely to rise. If one assumes that a platform would include 20 data centers and would host 100 applications, then the monitoring subsystem would need to maintain around 3 billion proximity metric values. This would equate to about 12 billion bytes of data assuming each data point is a 4-byte number. Given that the most reliable method of assessing proximity is to measure actual performance of a client's access, the above data would need to be periodically collected at the data centers and transferred to the platform core such as the authoritative DNS. Considering that this data needs to be constantly refreshed in order to provide a meaningful estimation of current performance, for example, a 30 second refresh period may be used, transferring such volumes of measurement data is current infeasible.

Another problem relates to the issue of obtaining proximity measurements. Active measurements to external clients are generally impossible because either the clients or their firewalls will prevent such measurements. Therefore, in order for the monitoring subsystem to obtain a passive performance measurement for a particular triplet of a client cluster, data center, application, a client from the cluster must access the application at the data center.

Often an application is only deployed in a limited number of IDC at any given time. Therefore, until an instance of the application is deployed in an IDC, no proximity measurements for an application associated with the IDC can be collected for a particular client cluster. This is problematic because until there are measurements indicating the benefits of deploying the application at a particular data center, it is not likely that the application will be deployed there. Thus, difficulty in predict performance of an application instance at a particular IDC for a particular client cluster is another problem the platform needs to address.

Provisioning for Internet Applications

In general, Internet applications follow a client-server computing model, where computation occurs in relatively small "chunks" corresponding to the processing of individual client requests. Aspects of the present invention can take advantage of this. Therefore, in an embodiment, the resources may be allocated among applications at request boundaries. In other words, an instance of an application does not need to be migrated from one server to another but instead a new instance of the application may be deployed and, if appropriate, the old instance may be decommissioned.

It should be noted that a typical three-tiered architecture of client/server/back-end resource, common with Internet applications, simplifies the issue of data consistency because updates often can be applied to the back-end database at the third tier. Further simplification of the process may be provided if the service is owned and operated by a single organization, such as a network operator such as AT&T. Having a single organization operate the platform reduces many of the challenges related to security, privacy, and billing that general grid technologies have to face.

In an embodiment, the platform may consist of a number of geographically distributed Internet data centers, each having a set of servers. The platform can monitor the demand for the hosted applications and the utilization of each server. In an embodiment it can make periodic decisions to allocate these servers to a set of applications it hosts and can distribute client requests among the various servers. Thus, the platform can be used as a utility computing platform for Internet applications.

In an embodiment the platform may provide a utility computing platform using commercial off-the-shelf server clustering technology. While such technology was originally designed for static resource configurations, the use of such technology can simplify the implementation of the platform. However, traditional server cluster technology introduces certain performance overheads when used in the dynamic environment.

It should be noted that various modules are described throughout this disclosure. The term module refers to one or more pieces of hardware, software, or an amalgam of hardware and software and may be considered a functional rather than physical distinction. Thus, for example, a server module may include one or more physical servers as is appropriate.

It is rioted that while the platform is discussed herein with respect to a DNS based systems, the platform may also be used with intelligent routing systems that provide finer grain decisions on routing. For example, the system disclosed in Ceasar et al., *Design and Implementation of a Routing Control Platform*, 2nd Symposium on Networked Systems Design & Implementation, USINEX Association, NSDI 2005, which is incorporated herein in its entirety, may be used with the platform. In other words, modules for redirecting requests to the appropriate IDC may be implemented by using other methods of redirecting requests and are not limited to a DNS-based policy as illustrated with this platform.

The platform runs applications on behalf of customers (i.e., application providers), and assigns resources to these applications according to the demand from end-users or clients. Each application may be run on top of a server application, which may include software that provides a J2EE environment to the applications. In an embodiment, only one application may run on any one server application instance and only one server application instance may run on any one server. If better resource utilization is called for, in an alternative embodiment the platform can use virtual machine monitors, such as those provided by VMWare, to multiplex several virtual server machines on the same physical machine.

Figure 2:
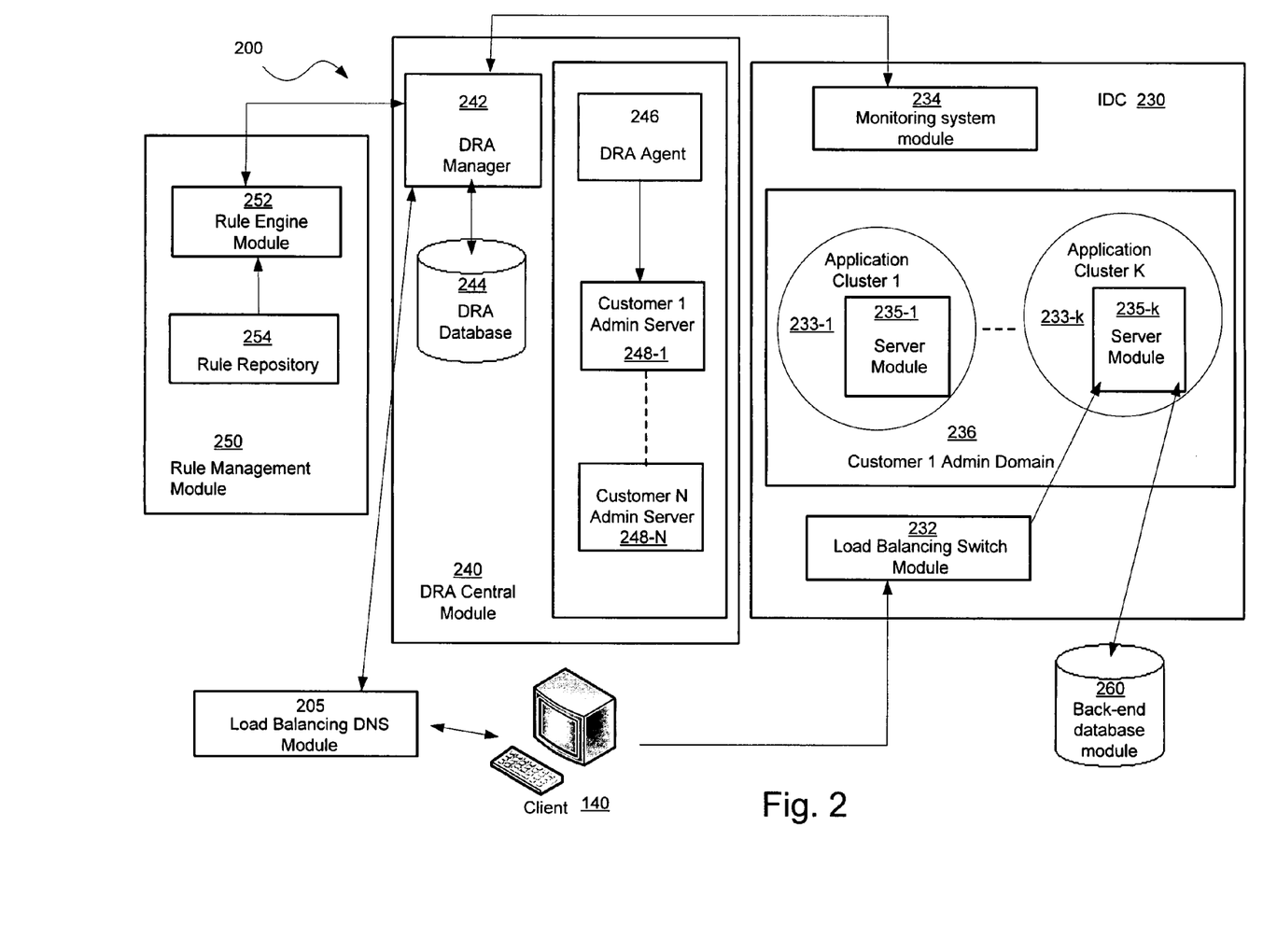
FIG. 2 illustrates an embodiment of a schematic representation of a platform in accordance with an aspect of the present invention.

Turning to FIG. 2, an embodiment of a general architecture of a platform 200 is illustrated. The platform 200 includes a Dynamic Resource Administrator Central (DRA Central) module 240, a rule management module 250 that includes an rule engine module 252 that encapsulates policies and algorithms used by the platform 200, a load-balancing DNS module 205 and may contain one or more geographically dispersed IDCs 230.

Each IDC 230 may include a number of application clusters 233-1 through 233-$k$ that may include allocated server modules 235-1 through 235-$k$ that nm the applications. To help direct client requests efficiently, a load-balancing switch module 232 may be provided in the IDC 230. In an embodiment the load-balancing switch module 232 can route a client request to the server module 235-1 through 235-$k$ that has the smallest load. The IDC 230 may also includes a monitoring system module 234 that collects information on client 140 requests and the load and health of the servers modules 235. This information can be reported to the DRA central module 240.

Figure 9:
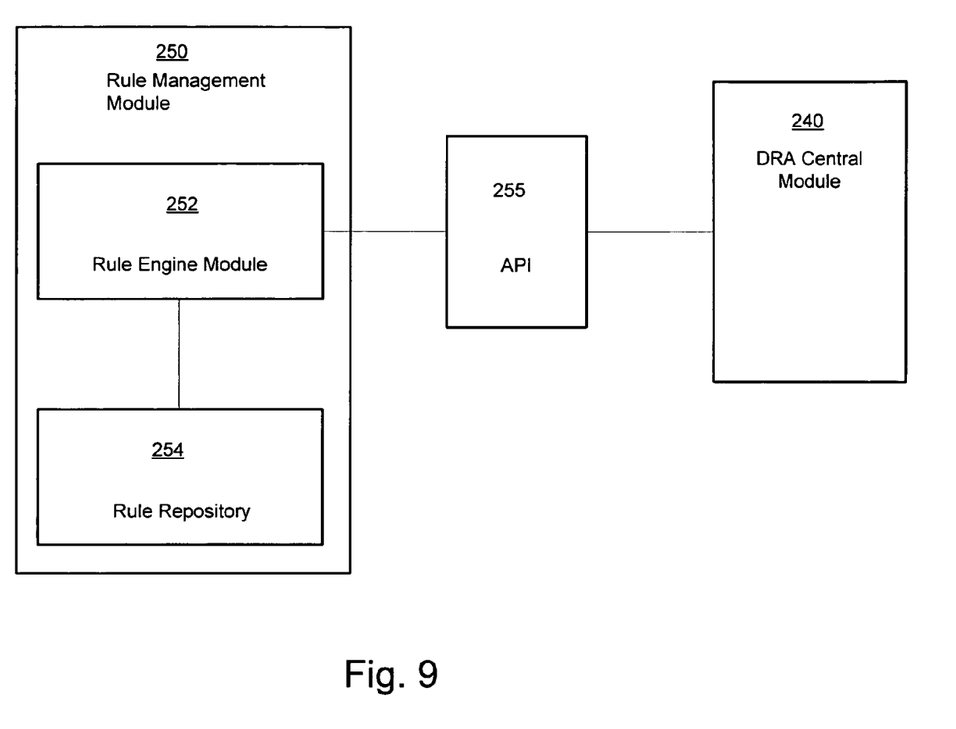
FIG. 9 illustrates a schematic representation of an interaction between modules in accordance with an aspect of the present invention.

The DRA central module 240 can act as the controller of the platform 200. It can monitor and manages the entire platform 200, and perform tasks such as reassigning application clusters 233 and server modules 235 among applications. While the DRA central module 240 implements various administrative actions, the rule engine module 252 can be used to determine when these actions should be enacted. The rule engine module 252 can interact with DRA central module 240 through a defined API 255 (FIG. 9). In an embodiment, the DRA central module 240 provides the rule engine module 252 with usage and load data collected from various IDC's 230, and the rule engine module 252 can use the DRA central module 240 to enact server initiation and firing policy rules.

In an embodiment, the platform 200 can periodically determine which IDCs 230 should run instances of a given application, and how many server modules 235 should be used. The platform 200 can then route client 140 requests for the application to the server modules 235 that are currently allocated to the application. As noted above, while a load balancing DNS module can be used, intelligent routing is also envisioned as being capable of implementing aspects of the present invention. The load balancing DNS module 205 receives information from the DRA central module 240 regarding which where to route a client's request for an application. It should be noted that if only one IDC 230 includes an instance of the desired application, then the decision is straightforward.

In an embodiment, when a client 140 requests access to an application, the request can go through two levels of load balancing. First, the load balancing DNS module 205 can direct the client 140 request to the optimal IDC 230 that hosts the requested application. The load balancing DNS module 205 can be periodically updated based on usage so that the decision reflects the current status of availability. Once the request arrives at the appropriate IDC 230, a load balancing switch module 232 can be used to route the request to one of the application clusters 233 so that the request may be processed by the server module 235 associated with application cluster 233. In an embodiment, the session created for the end-user persists and subsequent requests from the end-user continue to be routed to the same server 235 in the same IDC 230.

One advantage of the two-level request distribution is that such a system allows the platform 200 to react quickly to server failures and overloads. A pure DNS-based request distribution is hampered by DNS caching at the client side, which causes server selections to persist for minutes. However, in an embodiment, a load-balancing switch module 232 may monitor the health and load of the local server modules 235 continuously or on a frequent periodic basis such as every few seconds, and can be configured to respond to failures or load imbalances immediately.

As can be appreciated, the architecture of the system is relatively reliable. The loss of a server module 235, or even of an entire IDC 230, can be handled by routing traffic to other servers and IDCs that remain operational. In addition, new server modules 235 can be dynamically allocated to replace failed ones. The load-balancing DNS module 205 may be deployed in redundant pairs according to the DNS protocol requirements. The only single points of failure in the system are the DRA central module 240 and the rule management module 250 that includes the rule engine 252. However, these components of the platform 200 are not involved in processing client requests. Therefore, their failure only diminishes the platform's 200 ability to optimize or modify application cluster 233 and IDC 230 assignments. Thus, the processing of requests by the existing application instances may continue without concern for the health of the DRA central module 240.

In order to perform effectively, the platform 200 may use an application server program. In an embodiment, the application server program may comprise an off-the-shelf server application from a major commercial vendor. In an alternative embodiment, a customized piece of software may be written. Regardless of the source, the server application program shall be referred to as an Appserver module herein. The Appserver module may include characteristics such as cluster technology and J2EE application environment, which are typical of commercial products that are available.

Figure 5:
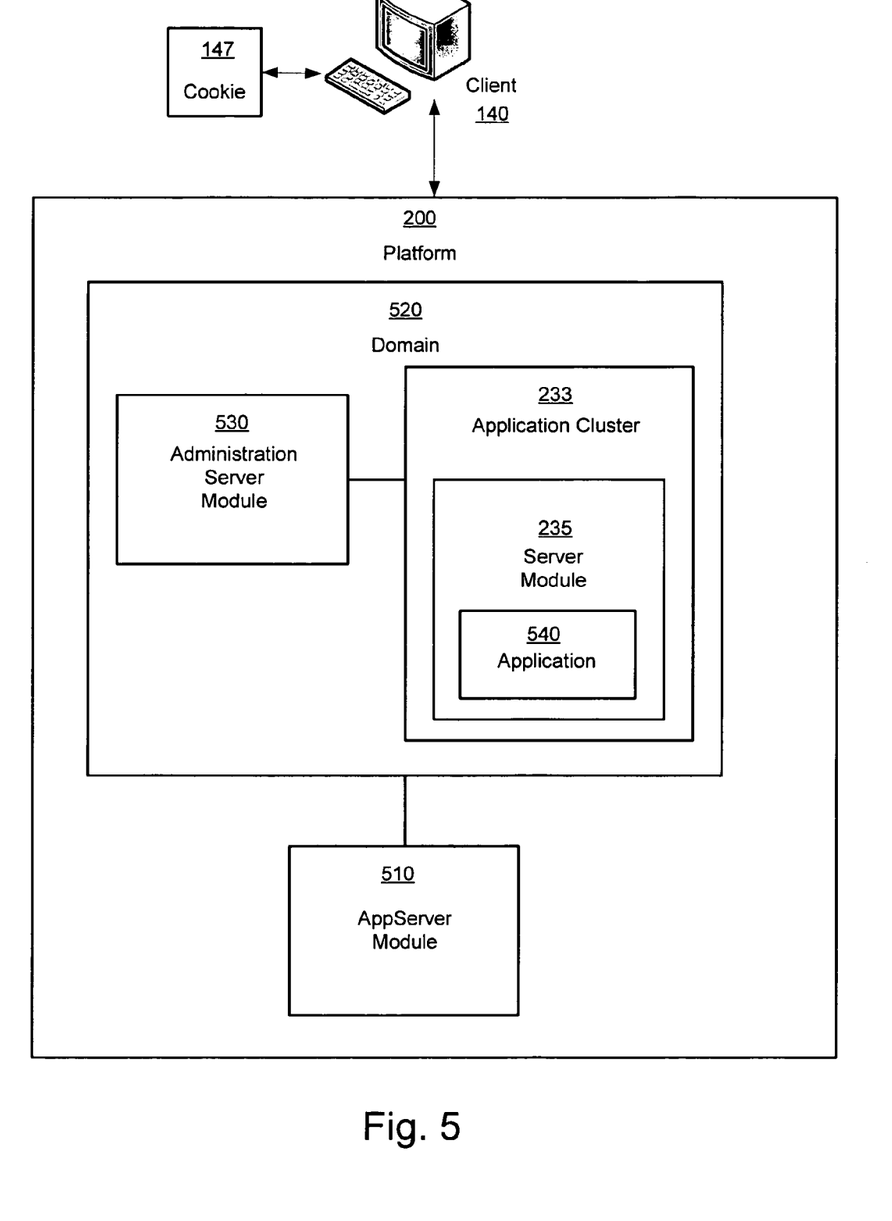
FIG. 5 illustrates a schematic representation of a platform in accordance with an aspect of the present invention.

Looking at FIG. 5, the operational framework provided by the AppServer module 510 allows server modules 235 to be grouped in domains 520 with administration server modules 530 composed of inter-related sets of resources such as AppServer instances. In an embodiment, the domain 520 may include one or more administration server modules 530 and may also include one or more server modules 235 within application clusters 233 (as depicted).

As discussed above, the platform can be used to provide a type of utility computing. To provide security, the platform 200 can allocate a separate domain 520 to each customer, where each customer specific domain contains one or more server modules 235 running any of the customer's applications 540. Because each domain 520 can be configured with distinct security settings and access rules, in an embodiment customers can only access resources allocated to their domain, including connectivity to back-end services.

In an embodiment, within a domain, all AppServer module 510 instances running the same application 540 and located in the same IDC 230 may be grouped in the same cluster (FIG. 2). When an application is first deployed at an IDC 230, a minimum number of server modules 235 are allocated as the application cluster 233, and the application cluster 233 is associated with a Virtual Internet Address (VIP). Consequently, the load balancing switch module 232 (FIG. 2) serving the IDC 230 is updated to map the assigned VIP to the new application cluster 233 of server modules 235. Thus, the platform's 200 load balancing DNS module 205 routes client packets to the chosen IDC 230 by returning the corresponding VIP to the client's 140 DNS query. The client packets then arrive to the IDC's 230 load balancing switch module 232, which forwards them to the appropriate server module 235 in the corresponding cluster 233.

Figure 6:
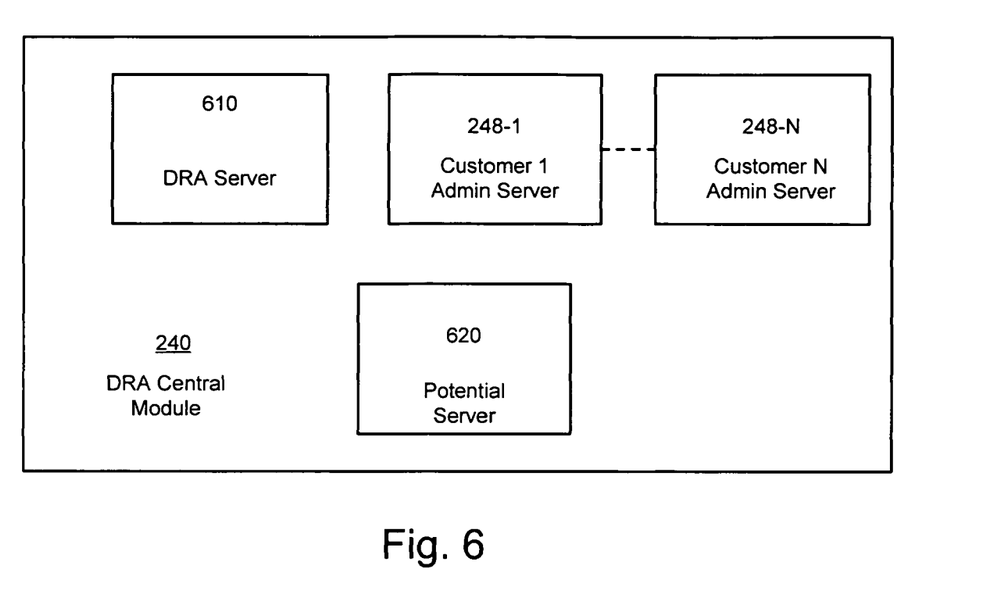
FIG. 6 illustrates an embodiment of a dynamic resource allocation central module in accordance with an aspect of the present invention.

Looking back at FIG. 2, the platform's DRA central module 240 can be implemented using the AppServer environment. In an embodiment, the DRA central module 240 may use a separate DRA domain 248-1 through 248-$k$ to deploy and manage the k customer domains. As depicted in FIG. 6, a DRA server 610 can run the DRA manager module 242 that keeps track of the system configuration, receives and processes the feedback from the IDC monitoring system modules 234, and interacts with the rule management module 250. In an embodiment, a DRA managed server 620 can run a DRA agent module 246. The DRA agent module 246 can be responsible for executing administrative actions invoked by DRA manager 242 within the customer domains through the customer administration servers 248. These administrative actions can include initialization of customer administration servers 248 for new customer domains and configuring changes within existing customer domains.

In an embodiment, creation of a new domain 520 (FIG. 5) can only be executed from an AppServer instance on the same server that will be the new domain's customer administration server 248. Therefore, the DRA agent module 246 can be deployed on each potential server 620 that can potentially become a customer administration server 248. Thus, in an embodiment, as depicted in FIG. 6, the DRA central module 240 may include the DRA server 610 running DRA manager 242 and a number of customer administration servers 248-1 through 248-N, each running one DRA Agent 246 belonging to the DRA domain and one or more Appserver instances for the customer domains. In addition, one or more potential servers 620 may be included in the DRA central module.

As can be appreciated, the platform 200 can obtain two benefits from using cluster technology. First, in an embodiment the domains 520 (FIG. 5) can provide consistency maintenance for deployed applications. A master copy of the application 540 can be maintained on the customer administration server 248 (FIG. 2). Therefore, updates can be pushed to all the server modules 235 where the application 540 is currently deployed.

Figure 7:
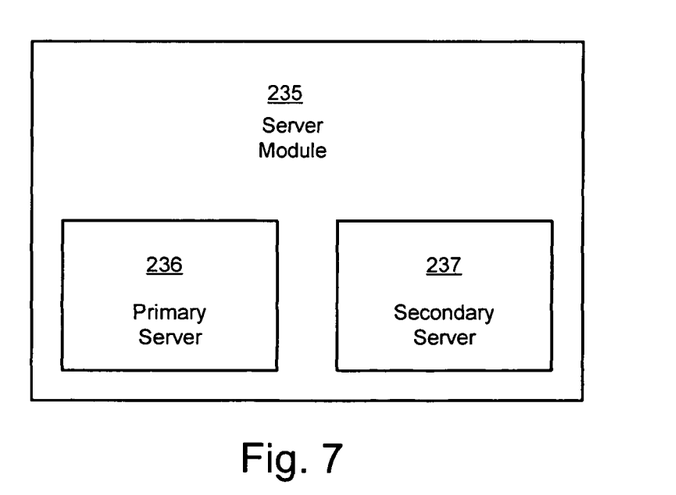
FIG. 7 illustrates an embodiment of a server module in accordance with an aspect of the present invention.

Second, in an embodiment the use of application clusters 233 can provide a transparent fail-over management mechanism that ensures the persistence of client sessions. In an embodiment, as depicted in FIG. 7, the server module 235 may include a primary server 236 and a secondary server 237. The client's session state may be replicated on a secondary server 237 inside the cluster 233 and the identity of the secondary replica may be stored in a cookie 147: provided to the client 140 (FIG. 5). If the primary server 236 fails, the load balancing switch module 232 (FIG. 2) redirects the request to any available server 235 in the cluster. When the server 235 receives the client 140 request, it uses the information in the client's cookie 147 to retrieve the session state replica from the secondary server 237.

In an embodiment this redundancy can be further extended so that session state persistence can be provided across IDCs 230. Normally, DNS response caching at the client side causes all requests from the client session to go to a first IDC 230-1. However, should the request be routed to a second IDC 230-2, the new server module 235-2 can recognize the original server module 235-1 from the request cookie 147 and use HTTP redirect to send the request to the VIP of server module's 235-1 IDC 230-1. From there, the persistence of the session state can be ensured by the application cluster 233 and the server module 235 as discussed above.

As illustrated in FIG. 2, each IDC 230 can include a monitoring system module 234, responsible to collect both application performance measurements for proximity metrics and load and operational status of the server modules 235 and/or the application cluster 233. The monitoring system module 234 may communicate the collected measurements to the DRA manager 242 through an Internet service supported by the DRA manager 242.

Referring back to FIG. 1, in an embodiment all clients 140 associated with a single LDNS may be treated as a single client cluster 110. The authoritative DNS 160 can view all DNS requests from client cluster 2 as equidistant to both IDCs 230-1, 230-2. Similarly, both IDCs 230-1, 230-2 can consider all demand coming from client cluster 110 as proximity-neutral and, therefore, the location of the client 140-1 will not trigger redeployment of the application. It should be noted that client clusters 110 concentrated around their LDNS will exhibit strong proximity bias while widely dispersed client clusters 110 will be treated consistently by all platform components as proximity-neutral.

To support this approach, it is helpful to maintain a database that contains a mapping of individual clients to their LDNS 122 and helps to identify client clusters 110 by their LDNS 122. A number of known methods may be used to derive these mappings. For example, an Internet bug based method such as is disclosed Zhuoqing Morley Mao, Charles D. Cranor, Fred Douglas, Michael Rabinovich, Oliver Spatscheck and Jia Wang, "A Precise and Efficient Evaluation of the Proximity between Web Clients and Their Local DNS Servers, In Proceedings of USENIX Annual Technical Conference, 2002, pages 229-242, which is incorporated herein by reference in its entirety, may be used to derive the mappings. However, any other appropriate method may also be used.

It should be noted that because some clients 140 may use more than one LDNS 122, in an embodiment the database of mappings may include the fraction of times each client 140 uses a particular LDNS, considering a configurable amount of history. Whenever the platform 200 takes another performance measurement of a client's 140 access to an application, this measurement is "charged" to the client cluster 110 selected with the probability equal to the fraction of time this client 140 uses the corresponding LDNS. In general, however, most clients 140 use a single LDNS.

In an embodiment, the platform may use actual performance measurements of accesses from different clients to different data centers as the proximity metric. To address the foregoing issues regarding measurement volume and the availability of measurements, the measurements may be separated into a front-end proximity, a back-end proximity, and application measurements. To be able to fully determine the estimated performance of a (client cluster, data center, application) tuple, performance information for every (client cluster, data center, application) tuple would be required. Due to the large number of tuples (about 3 billion in the above example), it is inefficient to maintain this information directly. Therefore, in an embodiment a (client cluster, data center, application) tuple can be calculated when it is needed from a much smaller set of data.

Figure 4:
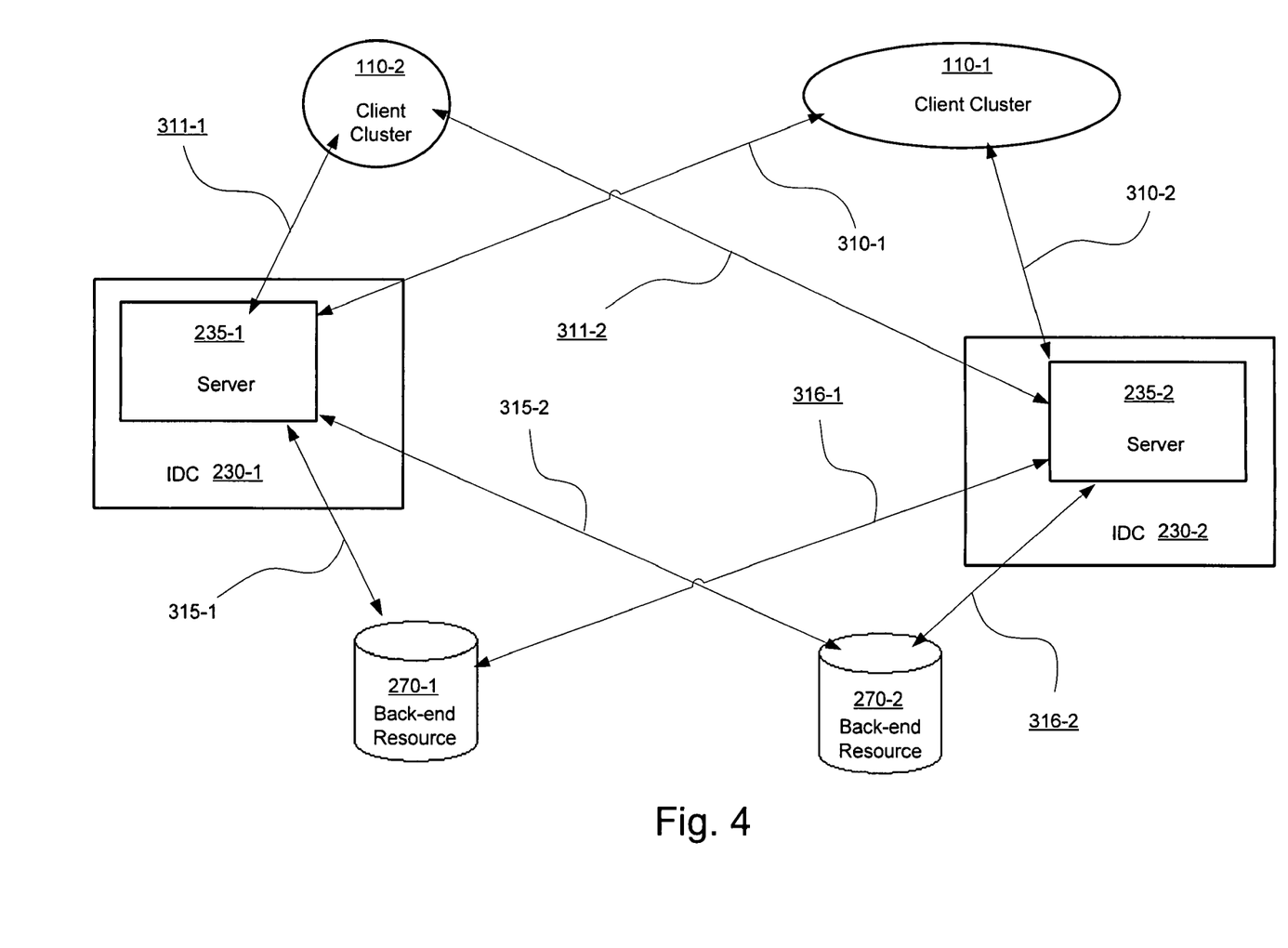
FIG. 4 illustrates a schematic representation of measuring proximity in accordance with an aspect of the present invention.

In an embodiment, the platform can collect performance measurements as illustrated in FIG. 4. To reduce the amount of data that is needed to calculate the (client cluster, data center, application) tuple, the platform can separately measure the proximity of client clusters to data centers (front-end proximity measurements), the proximity of data centers to back-end resources (back-end proximity measurements), and the traffic volumes of an application.

To measure the front-end proximity of a client cluster 110 to an IDC 230, the network monitoring module 234, which may include a network sniffer such as a Gigascope, can be placed in every IDC 230 to passively collect the round-trip time of all clients 140 visiting the particular IDC 230. The client-to-LDNS database can then be used to allocate measurements to proper client clusters. Thus, if a client within the cluster 110-2 accesses server 235-1 in IDC 230-1, a front-end proximity measurement for the IDC 230-1/client cluster 110-2 is obtained and may be stored. To reduce the amount of data needed, the front-end proximity measurement can be aggregated for all applications. In other words, the front-end proximity measurement for an IDC/client cluster can be application independent. If a client is mapped to multiple LDNSs 122, its front-end proximity measurement can be distributed among these LDNSs 122 probabilistically using the fractions stored in the client-to-LDNS database, as discussed above. If a client is not in the LDNS database, network aware clustering can be used to find all the LDNSs 122 that are in the client's network-aware cluster. Then the allocation of the front-end proximity measurement can be to these LDNSs 122 with equal probability. If no such LDNS is found, the front-end proximity measurement can be ignored. The proximity of each client cluster 110-1 through 110-(or, equivalently, each LDNS), to each data center can then computed as the (aged) average of the RTT measurements allocated to this cluster.

Assuming 1.5 million LDNSs and 20 IDCs 230, the number of possible metrics would be equal to the number of LDNSs multiplied by the number of IDCs, or around 30 million. This level of data is manageable. Furthermore, the front-end proximity is much more available using passive measurements than using end-to-end performance measurement. As noted above, the platform can obtain a valid front-end proximity metric for a given client cluster 110/IDC 230 as long as any client of the corresponding LDNS visits that IDC 230 to contact any application.

It should be noted that as passive measurements are used, the data will be somewhat historical because it is unlikely that all the combinations will be repeated frequently. However, as the front-end proximity measurement is primarily based on geographic factors that are slow to change, this generally will not be a problem. One potential problem, which will be addressed below, is how to handle a situation where a client cluster 110 has not previously interacted with any IDCs 230.

The proximity of data centers to back-end resources (the back-end proximity measure) can be determined using active probing. The limited number of applications (and hence back-end resources) and data centers makes active probing manageable, and active probing assures measurement availability. It is noted, however, that while there are only 100 applications and 20 IDCs in the above example, more than one back-end resource may be associated with a particular application. Therefore, there may be more than 2000 combinations. However, some of the back-end resources may be shared and anything in this range is manageable. Thus, the platform 200 maintains the back-end proximity for each IDC with respect to the associated back-end resource(s).

Finally, to obtain the application traffic measurement, the network monitor provided at each IDC 230 can passively collect the client-IDC and IDC-backend traffic volumes for every application and every backend resource the application uses, front_traff(app) and back_traff(app, backs). In an embodiment, the data in not specific to particular client clusters or data centers. Therefore, in such an embodiment the amount of data to be stored is small (and related to the number of applications) and it can be passively measured.

Figure 8:
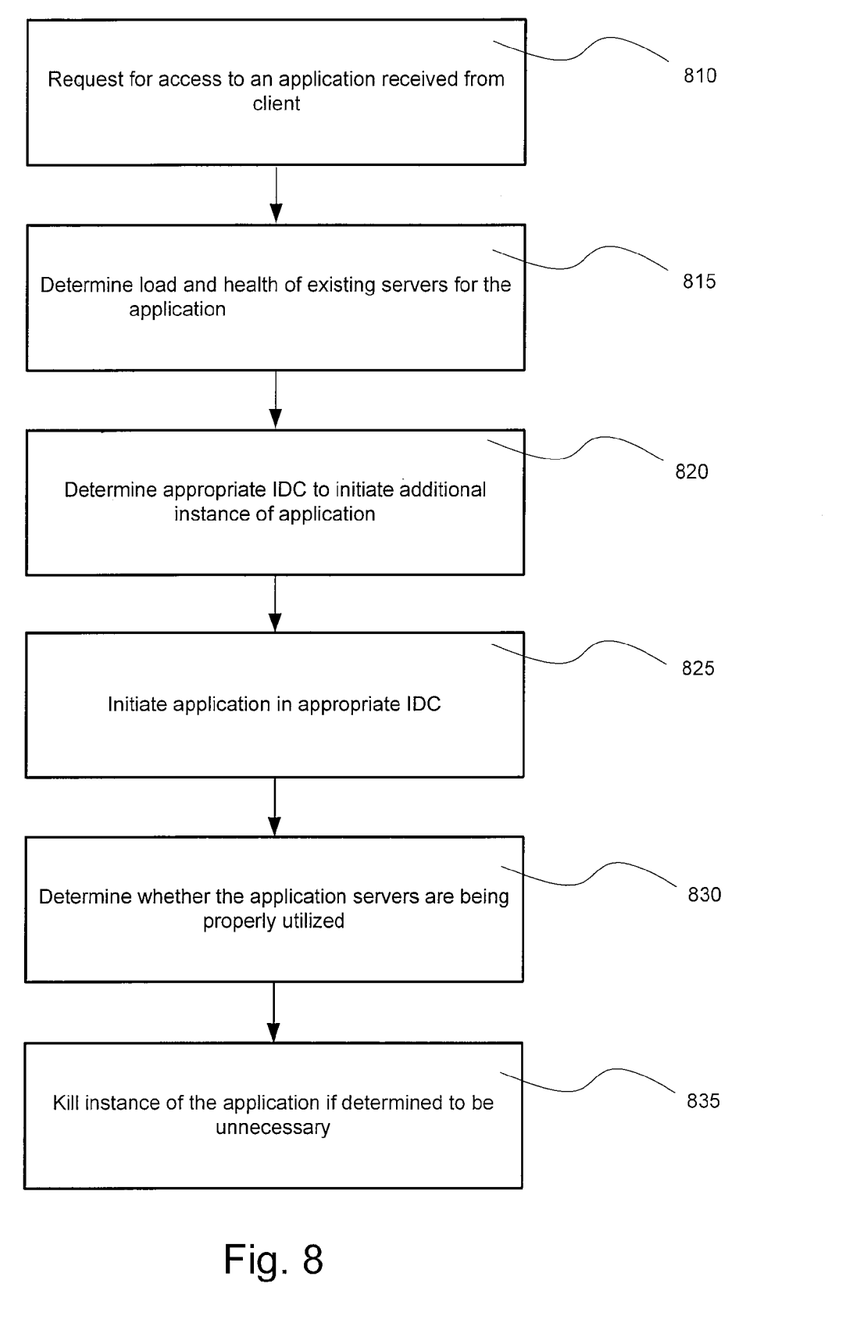
FIG. 8 illustrates a method of adjusting the number of instances of an application in accordance with an aspect of the present invention.

Turning to FIG. 8, an embodiment of a method of using this data is described. First in step 810, a request for an application is received from a client. In an embodiment, the client may be associated with a particular client cluster, in which case certain proximity data may be available.

In step 815, the platform determines that the current server running an instance of the application is under load. In an embodiment, this step can happen automatically in response to the receipt of a request from a new client or can happen on a periodic basis. In an embodiment, the monitoring system module 234 supplies information about utilization and availability of the servers allocated to customer applications. The monitoring system module 234 can take measurements about utilization of the server 235 CPU, the server disk and the server network card and can periodically send this information to DRA manager 242. This information can be exported to the rule engine module 252 for the detection of overloaded and under-loaded instances of the application. In an embodiment, the monitoring system module 234 can also detect violations such as hardware and OS failures and can notify the DRA manager 242 with a status message when failures occur.

It should be noted that the violation detection time typically is not instantaneous but instead has a built in delay period. In an embodiment, the detection delay period may be caused by three factors: the periodic testing of policy rules by the rule engine, the periodic refresh of demand and load data which provides input for rule testing by the monitoring system, and the communication and computation delay. Hence, the detection time depends on the refresh period of the monitoring system and on the execution period of rule engine. In an embodiment, the execution period of the rule engine module 252 can be set to 30 seconds, resulting in a 15 seconds average delay. In an embodiment the monitoring system module 234 delay may be between 20 and 30 seconds because the refresh period is set to 10 seconds and the monitoring system module 234 requires three consecutive violations before taking an action. It is noted that the deletion scenarios do not measure the artificial delay the system imposes on the deletion of the last application instance in a data center to accommodate DNS response caching by clients. This delay is caused by the DNS protocol and is not directly caused by characteristics of the platform.

In step 820, the platform determines the appropriate IDC to initiate another instance of the application. To determine the appropriate IDC, the platform can calculate the end-to-end proximity for the particular client cluster with respect to each IDC available. In an embodiment the DRA Center module 240 (FIG. 2) computes the proximity metric from a given client cluster to a given IDC for the particular application as an average of the front-end delay and the delays to all the back-end resources, weighted by the corresponding traffic ratios.

The following equation may be used to determine the proximity metric tuple for a particular LDNS/IDC/application combination:

$$prox(LDNS;\ IDC;\ app) = \frac{delay(LDNS;\ IDC) * \text{front\_traff}(app) + \sum_i [delay(IDC;\ back_i) * \text{back\_traff}(app;\ back_i)]}{(\text{front\_traff}(app) + \sum_i \text{back\_traff}(back_i))}$$

As illustrated, the variable "Delay (LDNS; IDC)" represents the front-end proximity measurement that may be passively measured and this value is multiplied by front_traff(app) which refers to the amount of front end traffic for the particular application. The variable $\Sigma_i$ [Delay (IDC; $back_i$)*back_traff(app; $back_i$)] refers to the back-end proximity measurement times the amount of back end traffic for the particular application. If the application accesses more than one back-end resource, this variable can take the access into account. These two values are summed and divided by the total amount of application traffic. It should be noted that other calculations may also be used to determine the proximity tuple for a particular client cluster/IDC/application. In an embodiment, if all the applications being run on all the IDCs 230 have nearly equal weighting for front-end and back-end traffic, then it may be unnecessary to use the weighting of traffic in the determination of the proximity measurements for a tuple. In another embodiment, the weighting may be based on an average of the application traffic for the front-end and back-end.

Therefore, as can be appreciated, numerous other equations may be used. The advantage of the illustrated equation is that all the variables are readily obtainable and represent factors that can change dynamically, thus the depicted equation provides a reasonable snap-shot of current conditions. In an embodiment, the proximity metric can be determined for all the IDCs 230. In another embodiment, the proximity metric can be determined for a set of the IDCs 230. The set can be selected according to geographical boundaries or some other appropriate distinction and can range from 1 to some positive integer.

Based on the above proximity metric, the platform can rank IDC's according to their proximity to individual LDNSs. It is noted that there may be LDNSs that have not been associated with any clients, or whose clients have not been active enough to collect the meaningful proximity metrics. These LDNSs represent inactive client clusters and are less important to be treated optimally. In an embodiment, requests from these inactive client clusters can routed to geographically proximate IDCs based, where the proximity can be derived from geographical distances and peering relationships with networks responsible for the IP address.

It should be noted that customer policies may also effect the initiation of additional instances of the application. The platform 200 can encapsulate algorithms for resource allocation, including both customer policies and the system algorithms, into a rule repository 254 (FIG. 2). These rules can be periodically evaluated by the rule engine 252, which communicates with the rest of the system through an API exported by the DRA manager 242.

As can be appreciated, depending on how the platform is configured, certain benefits may be provided, four of which are provided below. First, the platform may incorporate customer resource allocation policies into the overall resource allocation algorithms because both are specified as a set of rules. Second, the platform may allow customer account managers to change customer policies by rewriting a textual file containing the customer rules. In an embodiment, the rules may be provided in an intuitive language so that customer account managers do not require familiarity with a particular development environment or extensive programming experience. Third, the platform facilitates simulation studies and "what-if" analysis of particular algorithms because the same inputs and specification are available for use in a simulation and for use in the actual platform. Fourth, the platform can cause changes to customer policies or even the platform algorithms to be a light-weight operation, because these changes can be enacted by simply editing the text files containing the rules, without recompilation or a restart of a portion of the platform.

Moreover, the rule management module 250 does not need to be changed if the platform core modifies its API to export new information. In an embodiment, the rule engine module 252 can directly access and manipulate the new API elements through a Java Reection mechanism. Thus, rule writers can immediately use the new APIs in their rules.

In an embodiment, all the rules can be maintained in a rule repository 254, which may be implemented as a text file. Separate sets of rules can be specified for each application and customer, thus allowing different applications to have distinct customer policies and default algorithms.

In step 825, the platform initiates an application in the appropriate IDC, which may be the same IDC or may be a new IDC. This may require the initiation of a new server module 235. Certain delays may result from such an initiation. Tests have shown that major component of the reaction time is the creation of the server instance, which is the boot time of the AppServer server instance. Furthermore, the observed boot time is considerably longer when the server is in a remote IDC than when it is in the IDC co-located with the administration server.

Another noticeable delay component is the configuring of the load balancing switch module 232. When a new server is added to an existing cluster, the load balancing switch module 232 must add the server instance to its VIP pool. When a new application cluster is created, the load balancing switch module 232 must first associate a new VIP to the cluster and only then add the server to it.

It should be noted that when the application is deployed in a new IDC 230, the load-balancing DNS module 205 becomes aware of the new IDC 230 only through regular server utilization updates from the monitoring system module 234. This can introduce an additional delay.

Tests have shown that one of the major components of boot delay, especially in the case of local application cluster creation, is the synchronization of the application cluster. Cluster synchronization can contribute 30 seconds to the delay (which may be in the range of 1.5 to 2.5 minutes, and on further examination, is due to the fact that the synchronization process is totally driven by timeouts, instead of active acknowledgments of the communicating parties. Therefore, using active acknowledgements is expected to significantly improve the reaction time, which is more important in a dynamic environment such as is envisioned for the platform.

Next, in step 830, the platform 200 (FIG. 2) determines whether an instance of application or a server module 235 is being under utilized. The rule engine module 252 can periodically read and evaluate the rules in the rule repository 254. To evaluate and enact rules, the rule engine module 252 may interact with the DRA manager 242 using an API 255 (FIG. 9) with parameter fields, status fields, informational methods and operational methods. Parameter fields may store configurable parameters related to a given application such as the minimum and maximum number of replicas to be deployed in the entire system or in one data center or the demand threshold that triggers deployment of another replica. These fields can be both tested and modified by the rules. Status fields provide information on client demand and server load. These fields can only be tested by the rules. Informational methods return similar information as status field but need to be computed. An example of an information method is a method that returns the number of current application instances. Operational methods represent actions a firing rule can invoke.

Rules may be expressed in a readable language through a simple Java-like syntax and may directly reference the API entities exported by, DRA manager 242. The rules may follow a common IF-Condition-Action pattern. In an embodiment, the condition part of the rule may be a generic logical expression where terms are fields or informational methods. The action part of the rule may specify one or more operational methods or can include a SET statement, which is used to change the value of parameter fields. The condition part of the rule is optional and is assumed to evaluate to TRUE if omitted.

Finally, in step 835, if an instance of the application is determined to be unnecessary then it may be killed.

Given proximity ranking of client clusters 110 and IDCs 230, the DRA manager 242 can aggregate client clusters 110 with similar rankings into regions. The DRA manager 242 can then uses the IDC 230 proximity ranking for the regions to continuously update the application usage statistics and to export these statistics to the rule engine module 252 so that they may be used for testing the policy rules. It is noted that platform policies depend on the implementation of the rule engine module 252 and therefore are discussed herein.

As noted above, rules can be easily adjusted. For example, the following rule may be used to adjust the number of instances of an application deployed:

SET
   MinNumServers EQ 10
IF
   AppHasServersUnderloaded( )
   AND
   NumRunningServers( ) GT MinNumServers
THEN
   UndeployAppReplicas(1)

The SET statement assigns a new value to the minimum number of replicas deployed for the application. This value can be changed depending expected need. Next, the IF rule is considered eligible for execution if the system detects underloaded severs allocated to the application and the number of replicas is greater than the established minimum. The corresponding action causes the decommission of one instance of the application. In an embodiment, a default algorithm may be used to select the instance to kill. As can be appreciated, numerous algorithms such as last in first out may be used. In addition, changing the minimum number of servers is as simple as adjusting a number in a text file.

Rules can also provide adjustments for known seasonal changes and for known upcoming events. For example, the following rule provides:

IF
   month EQ December
   AND
   day GT 15
THEN
   SET
   Maxnumservers EQ 100

As can be appreciated, the above rule increases the maximum number of servers that can be allocated to the application. An upcoming known event could be planned for by increasing the maximum number of servers on a particular day rather then the second half of the month. As can be appreciated, a potential advantage of the present system is that rather than simply add resources, instead it is possible to add resources in an intelligent manner based on local and global factors.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A method of adjusting a routing of requests for an Internet application on a content distribution network, comprising:
   measuring a front-end proximity of a client cluster to an Internet data center running an instance of the Internet application;
   measuring a back-end proximity of the Internet data center to a back-end resource;
   measuring a first volume of network traffic communicated between the client cluster and the Internet data center, the first volume of network traffic specific to the Internet application;
   measuring a second volume of network traffic communicated between the back-end resource and the Internet data center, the second volume of network traffic specific to the Internet application;
   calculating at least one performance metric for the Internet application with respect to the client cluster based on the front-end proximity, the back-end proximity, the first volume, and the second volume; and
   routing the requests for the Internet application from a client at the client cluster to the Internet data center in response to the calculated at least one performance metric;
   wherein the calculating at least one performance metric comprises:
   multiplying the front-end proximity by the first volume of network traffic specific to the Internet application to provide a first product;
   multiplying the back-end proximity by the second volume of network traffic specific to the Internet application to provide a second product; and
   dividing the sum of the first product and the second product by the sum of the first volume and the second volume.

2. The method of claim 1, wherein the measuring the front-end proximity comprises:
   passively collecting a round-trip time of at least one client that is a member of the client cluster.

3. The method of claim 1, wherein the measuring the front-end proximity comprises:
   collecting a plurality of round-trip times for a plurality of clients that are members of the client cluster; and
   aggregating the plurality of round-trip times for the plurality of clients.

4. A method comprising:
   measuring at a first Internet data center a front-end proximity of a client cluster to the first Internet data center, wherein the first Internet data center is running a first instance of an Internet application;
   measuring at the Internet data center a back-end proximity of the first Internet data center to a back-end resource that the first instance of the Internet application needs to access to process a request for the Internet application received from a client at the client cluster, and wherein the back-end resource is further needed by a second instance of the Internet application at a second Internet data center;
   measuring at the first Internet data center a first volume of network traffic communicated between the client cluster and the first Internet data center, the first volume of network traffic specific to the first instance of the Internet application;
   measuring at the first Internet data center a second volume of network traffic communicated between the back-end resource and the first Internet data center the second volume of network traffic specific to the first instance of the Internet application;
   calculating a first performance metric for the first instance of the Internet application with respect to the client cluster based on the front-end proximity, the back-end proximity, the first volume, and the second volume;
   providing the first performance metric to a resource administration module;
   determining at the resource administration module a preferred Internet data center of the first and second Internet data centers to associate requests for the Internet application from clients at the client cluster, the determining based on the first performance metric and a second performance metric received from the second Internet data center;
   providing routing information corresponding to the preferred Internet data center to a load balancing domain naming server (DNS); and
   routing a requests for the Internet application from the clients at the client cluster based on the routing information;

wherein the calculating the first performance metric comprises:
multiplying the front-end proximity by the first volume of network traffic specific to the Internet application to provide a first product;
multiplying the back-end proximity by the second volume of network traffic specific to the Internet application to provide a second product; and
dividing the sum of the first product and the second product by the sum of the first volume and the second volume.

5. The method of claim 4, wherein measuring the front-end proximity comprises:
passively measuring a round-trip network delay associated with servicing of the request of at least one client that is a member of the client cluster.

6. The method of claim 4, wherein measuring the front-end proximity comprises:
passively measuring a round trip network delay associated with servicing a request for one or more Internet applications for a plurality of clients that are members of the client cluster; and
aggregating the network delays for the plurality of clients.

7. The method of claim 4, wherein measuring the back-end proximity comprises:
actively probing to determine the proximity of the first Internet data center to the back-end resource.

8. The method of claim 4, wherein the back end resource is a first back-end resource and measuring the first volume and the second volume comprises:
passively measuring the volume of network traffic between the first Internet data center and the client cluster for the Internet application; and
passively measuring the volume of network traffic between the first Internet data center and the first back-end resource.

9. The method of claim 8, wherein the Internet application needs to access a second back-end resource and measuring the first volume and the second volume further comprises:
measuring the volume of traffic between the first Internet data center and the second back-end resource.

10. The method of claim 4, further comprising:
initiating the second instance of the Internet application at the second Internet data center in response to calculating the first performance metric; and
routing the request for the Internet application from the client at the client cluster to the second instance of the Internet application at the second Internet data center.

11. The method of claim 4, further comprising determining at the first Internet data center server utilization information associated with the Internet application.

12. The method of claim 11, further comprising associating the request for the Internet application with a first server of a plurality of servers at the first Internet data center based on the server utilization information.

13. An Internet content distribution platform comprising:
a first Internet data center and a second Internet data center, each comprising:
a server comprises memory and CPU; a server module operable to execute a software application; and a monitoring system module coupled to the server module;
a back-end module coupled to the first Internet data center and to the second Internet data center, the back-end module to provide a resource required by the software application to process a request received at the first Internet data center or at the second Internet data center, the request received from a client included at a client cluster, and wherein tile resource is not available at another module;
a resource administrator module coupled to the monitoring system module of the first Internet data center and to the monitoring system module of the second Internet data center and operable to:
receive front-end proximity information and back-end proximity information from each monitoring system module;
receive front-end network traffic volume information specific to the software application from each monitoring system;
receive back-end network traffic volume information specific to the software application from each monitoring system; and
calculating at least one performance metric based on the front-end proximity information and back-end proximity information, the front-end network traffic volume information, and the back-end network traffic volume information;
determine preferred route information based on the received proximity and volume information; and
a domain name server coupled to the resource administrator module and operable to receive requests from clients at the client cluster and to route the requests to a select one of the first Internet data center or the second Internet data center based on the preferred route information;
wherein the calculating at least one performance metric comprises:
multiplying the front-end proximity information by the front-end network traffic volume information of network traffic specific to the software application to provide a first product;
multiplying the back-end proximity information by the back-end network traffic volume information of network traffic specific to the software application to provide a second product; and
dividing the sum of the first product and the second product by the sum of the front-end network traffic volume information and the back-end network traffic volume information.

14. The Internet content distribution platform of claim 13, wherein the front-end proximity information represents a proximity of the first Internet data center and the second Internet data center to each of a plurality of domain name servers, and the back-end proximity information is representative of a proximity of the first Internet data center and the second Internet data center to the back-end module.

15. The Internet content distribution platform of claim 14, wherein the front-end proximity information is further representative of a proximity of the first Internet data center and the second Internet data center to each of a plurality of clients at the client cluster.

16. The Internet content distribution platform of claim 13, wherein the monitoring system module if further operable to determine server utilization information associated with each software application.

17. The Internet content distribution platform of claim 16, wherein the preferred route information is further determined based on the server utilization information.

18. The Internet data center of claim 16, further comprising a load balancing switch module and a second server module, the load balancing switch coupled to the first and second server module and to the monitoring system module and operable to associate the request from the client to a select one the first server module and the second server module based on the server utilization information.

19. The Internet content distribution platform of claim 16, wherein the resource administrator module is further operable to initiate execution of an application at a server at an Internet data center based on the server utilization information.

20. The Internet content distribution platform of claim 16, wherein the resource administrator module is further operable to terminate execution of an application at a server at an Internet data center based on the server utilization information.

* * * * *